United States Patent
Johnson et al.

(10) Patent No.: US 11,425,854 B2
(45) Date of Patent: Aug. 30, 2022

(54) METHOD OF PLANTING MULTIPLE SEED VARIETIES

(71) Applicant: CNH Industrial America LLC, New Holland, PA (US)

(72) Inventors: Chad M. Johnson, Arlington Heights, IL (US); Johnathon Dienst, DeKalb, IL (US); Marvin A. Prickel, Homer Glen, IL (US); Grant MacDonald, Hampshire, IL (US); Jason T. Czapka, Munster, IN (US); Michael J. Connors, Lockport, IL (US); Christopher Schoeny, Joliet, IL (US)

(73) Assignee: CNH Industrial America LLC, New Holland, PA (US)

( * ) Notice: Subject to any disclaimer, the term of this patent is extended or adjusted under 35 U.S.C. 154(b) by 283 days.

(21) Appl. No.: 16/782,589

(22) Filed: Feb. 5, 2020

(65) Prior Publication Data

US 2020/0170178 A1    Jun. 4, 2020

Related U.S. Application Data

(62) Division of application No. 15/833,068, filed on Dec. 6, 2017, now Pat. No. 10,660,261.

(51) Int. Cl.
*A01C 7/04*      (2006.01)
*A01C 21/00*     (2006.01)

(52) U.S. Cl.
CPC ............ *A01C 7/046* (2013.01); *A01C 21/005* (2013.01)

(58) Field of Classification Search
CPC ....... A01C 7/046; A01C 21/005; A01C 7/044; A01C 7/042; A01C 7/04; A01C 7/00; A01C 21/00
See application file for complete search history.

(56) References Cited

U.S. PATENT DOCUMENTS

| | | | |
|---|---|---|---|
| 3,944,137 A | 3/1976 | Cutchins et al. | |
| 6,003,455 A | 12/1999 | Flamme et al. | |
| 6,644,225 B2 | 11/2003 | Keaton | |
| 6,718,891 B1 | 4/2004 | Burbage, Jr. et al. | |
| 6,748,885 B2 | 6/2004 | Sauder | |
| 7,237,496 B2 | 7/2007 | Bettin et al. | |
| 7,373,890 B2 | 5/2008 | Kowakchuk | |
| 7,647,875 B2 | 1/2010 | Landphair et al. | |
| 8,843,281 B2 | 9/2014 | Wilhelmi et al. | |
| 8,850,997 B2 | 10/2014 | Silbernagel et al. | |

(Continued)

FOREIGN PATENT DOCUMENTS

EP          2901836       5/2015

*Primary Examiner* — Christopher J. Novosad
(74) *Attorney, Agent, or Firm* — Rebecca L. Henkel; Rickard K. DeMille

(57) ABSTRACT

A multiple variety planter has a direct vacuum system that allows for planting multiple varieties of seed while reducing occurrences of mis-planting events or planting inconsistencies such as multiples and skips by providing highly controllable seed meter vacuum performance characteristics that are controllable on a row-by-row basis. The direct vacuum system may include a vacuum unit at each row unit of the planter to apply a vacuum pressure to a seed meter at the row unit. Each vacuum unit may be individually and variably controlled to apply different vacuum pressures based on which seed variety is being planted with the respective seed meter at a given time.

20 Claims, 4 Drawing Sheets

(56) References Cited

U.S. PATENT DOCUMENTS

| | | | |
|---|---|---|---|
| 8,942,896 B2 | 1/2015 | Mayerle | |
| 9,179,594 B2 * | 11/2015 | Graham | ............... A01C 21/005 |
| 9,277,688 B2 | 3/2016 | Wilhelmi et al. | |
| 9,585,303 B2 | 3/2017 | Rylander | |
| 2013/0174766 A1 | 7/2013 | Zielke et al. | |
| 2014/0277959 A1 | 9/2014 | Wagers et al. | |
| 2015/0223390 A1 | 8/2015 | Wendte et al. | |
| 2015/0282422 A1 | 10/2015 | Hahn et al. | |
| 2016/0007523 A1 | 1/2016 | Rylander | |
| 2016/0029552 A1 | 2/2016 | Straeter | |
| 2016/0037713 A1 | 2/2016 | Wendte et al. | |
| 2016/0165792 A1 | 6/2016 | Henry | |
| 2016/0192581 A1 | 7/2016 | Henry | |

* cited by examiner

METHOD OF PLANTING MULTIPLE SEED VARIETIES

CROSS-REFERENCE TO RELATED APPLICATION

This application is a division of U.S. Ser. No. 15/833,068, filed Dec. 6, 2017, the entirety of which is incorporated herein.

FIELD OF THE INVENTION

The invention relates generally to planters and, in particular, to planters for planting multiple types or varieties of seed and a direct vacuum system that applies different vacuum pressures on a row-by-row basis based on characteristics of the different seed varieties.

BACKGROUND OF THE INVENTION

Modern farming practices strive to increase yields of agricultural fields. Technological advances of planters allow for better agronomic characteristics at the time of planting, such as providing more accurate seed depth, improved uniformity of seed depth across the planter, and improved accuracy of in-row seed spacing. To reduce operating expenses, farm equipment is operated at relatively faster travel speeds, which reduces the amount of operating time to complete certain tasks. When operating equipment at faster travel speeds, it can be important to maintain the quality of operation and good agronomic characteristics that can be achieved while operating at relatively slower operating speeds. This can be especially difficult to accomplish during planting, which requires precise seed depth placement and spacing accuracy in order to maintain a good seed environment. Furthermore, a single field can have yield performance inconsistencies between different areas of the field. That is because a field can have a wide variety of soil types and management types or zones, such as irrigated and non-irrigated zones in different areas. Seed companies are developing multiple varieties of each of their seed product types to optimize yield in these different areas. The different seed varieties offer improved performance characteristics for different types of soil and management practices. Efforts have been made to plant multiple varieties of a particular seed product type in different areas of fields with different soil types or management zones. These efforts include planters that allow for planting two varieties and include ancillary row units or two separate and distinct seed meters at every row unit, some of which have included dedicated vacuum sources for the different meters or groups of meters that plant the different seed types, but such duplication of components adds to the cost and complexity of the planter. Other planters allow for planting multiple varieties by feeding seeds of different varieties to seed meters at different times. However, feeding different seed varieties at different times to seed meters can lead to planting inconsistencies because the selected meter components and seed meter settings that are optimized for one seed type may not work as well with other seed types. Such planting inconsistencies can be worsened at the high travel speeds of modern planters.

SUMMARY OF THE INVENTION

The present invention is directed to systems for row crop planting that allow for planting multiple varieties of seed while reducing occurrences of mis-planting events such as multiples and skips by providing highly controllable seed meter vacuum performance characteristics that are controllable on a row-by-row basis.

According to one aspect of the invention, a direct vacuum system provides the ability to change vacuum pressure on a row-by-row basis while planting. This facilitates planting different seed varieties on a row-by-row basis because a vacuum application strategy can be implemented that applies an appropriate vacuum pressure for the particular seed variety being planted at a given time and can be changed to correspond to different varieties according to a prescription map. Planting different seed varieties on a row-by-row basis with different vacuum pressures instead of per-section, which may be as many as twelve or more rows, allows for more accurate seed spacing and higher yields. The vacuum application strategy may change vacuum pressure applied by a direct vacuum unit at a given row unit based on characteristics of the different seed varieties, such as seed size, seed shape, and seed weight.

According to another aspect of the invention, the direct vacuum system controls its vacuum units to compensate for less than optimal fit between the physical characteristics of some seed varieties being planted according to a prescription map and the metering member(s) being used in the seed meter(s). The direct vacuum system accommodates different seed-to-seed meter holding characteristics of the different seed varieties.

According to another aspect of the invention, a multiple variety seed planter is provided that includes a direct vacuum system. The multiple variety seed planter is configured for planting different seed varieties at different locations of an agricultural field, for example, based on different zones of a prescription map of the field. The multiple variety seed planter includes a frame. Row units are supported by the frame and seed storage compartments are supported by the row units. In some central bulk-fill embodiments, seed storage compartments may be supported by the frame for bulk storage. Each of the row units includes a seed meter and each seed meter has a seed meter housing that defines a housing cavity and a metering member that rotates in the housing cavity to singulate the seed from a seed pool for planting. A direct vacuum system includes a vacuum unit at each row unit. The vacuum units may be individually and variably controlled and each applies vacuum pressure to its respective seed meter. The vacuum units may correspondingly be discrete vacuum sources for the individual seed meters at the row units. Each vacuum unit may include a vacuum unit housing and a vacuum unit fan arranged within the vacuum unit housing to create an airflow that draws air out of and create vacuum pressure within the individual seed meter. A control system may be configured to individually control each vacuum unit, allowing their separate control. At each row unit, the control system may determine which of the multiple seed varieties is currently being planted and control the vacuum unit based on the currently planted seed variety.

According to another aspect of the invention, the vacuum unit is configured to apply a first vacuum pressure to the seed meter when the seed meter plants a first seed variety and a second vacuum pressure to the seed meter when the seed meter plants a second seed variety.

According to another aspect of the invention, the different seed varieties have different physical characteristics, which influence how they interact with the metering member in the seed meter. These different physical characteristics of the different seed types may require different vacuum pressures to be suitably picked up from the seed pool and carried to a release location in the seed meter while avoiding instances of more than one seed simultaneously released, referred to as multiples, or instances of no seed being released during what should have been a release event, referred to as skips. The vacuum unit may apply different vacuum pressures to the seed meter for the different sizes, shapes, and/or weights of different seed varieties to ensure that the seeds get picked up from the seed pool, suitably held against the metering member and carried through the seed meter by the rotating metering member, and singularly released from the metering member and seed meter for planting the field.

According to another aspect of the invention, a first row unit has a first seed meter with a first metering member delivering a first seed variety as a current variety of the first row unit. A second row unit has a second seed meter with a second metering member delivering a second seed variety as a current variety of the second row unit. The direct vacuum system is configured to directly and individually apply vacuum pressure to the first and second seed meters. The direct vacuum system may include a first vacuum unit that is arranged at the first row unit to deliver vacuum pressure to the first seed meter at a first vacuum pressure. The first vacuum pressure may correspond to a characteristic of the first seed variety. A second vacuum unit is arranged at the second row unit to deliver vacuum pressure to the second seed meter at a second vacuum pressure. The second vacuum pressure may correspond to a characteristic of the second seed variety.

According to another aspect of the invention, the characteristic is size, such that the first seed variety is a first size and the second seed variety is a second size. The different first and second vacuum pressures correspond to pressures for holding the first and second seed varieties of the first and second sizes against the first and second metering members to move through and be delivered out of the first and second seed meters.

According to another aspect of the invention, the characteristic is shape, such that the first seed variety is a first shape and the second seed variety is a second shape. The different first and second vacuum pressures correspond to pressures for holding the first and second seed varieties of the first and second shapes against the first and second metering members to move through and be delivered out of the first and second seed meters.

According to another aspect of the invention, the direct vacuum system is configured so that when the first seed meter changes from delivering the first seed variety to the second seed variety as the current variety of the first row unit, the first vacuum unit changes from delivering vacuum pressure from the first vacuum pressure to the second vacuum pressure. When the second seed meter changes from delivering the second seed variety to the first seed variety as the current variety of the second row unit, the second vacuum unit changes from delivering vacuum pressure from the second vacuum pressure to the first vacuum pressure.

According to another aspect of the invention, a method is provided for multiple variety planting with a direct vacuum system. The method includes planting a first seed variety from a seed meter having a metering member. Vacuum is directly applied at a first vacuum pressure to the metering member of the seed meter to hold the seeds of the first seed variety against the metering member. The first vacuum pressure corresponds to a characteristic of the first seed variety. The seed variety being planted is switched from the first seed variety to a second seed variety. Vacuum is applied at a second vacuum pressure to the metering member of the seed meter to hold the seeds of the second seed variety against the metering member with the second vacuum pressure. The second vacuum pressure corresponds to a characteristic of the second seed variety.

According to another aspect of the invention, the method may include determining a mixture phase corresponding to a switchover event, during which seeds of both of the first and second varieties are in a seed pool of the seed meter. A vacuum unit may be controlled at the row unit based on seed delivery inconsistencies during the mixture phase at the switchover event. The direct vacuum system may start applying a higher pressure and, if multiples are detected, incrementally decrease pressure until the inconsistencies are sufficiently reduced. Or, the direct vacuum system may start applying a lower pressure and, if skips are detected, incrementally increase pressure until the inconsistencies are sufficiently reduced.

According to another aspect of the invention, the vacuum unit may be controlled to apply the greater vacuum pressure of the first and second vacuum pressures to the seed meter during the mixture phase. During the mixture phase, while applying the greater of the first and second vacuum pressures to the seed meter, evaluation of occurrences of multiples continues. If multiples are detected, then the vacuum unit is controlled to decrease the vacuum pressure. The vacuum unit may decrease the vacuum pressure to an intermediate vacuum pressure that has a value between the first and second vacuum pressures. Evaluation of multiples may continue during the mixture phase and, if further multiples are detected while operating at the intermediate pressure value, then the vacuum unit may further decrease pressure to apply the lower of the first and second vacuum pressures.

According to another aspect of the invention, the vacuum unit may be controlled to apply the lower vacuum pressure of the first and second vacuum pressures to the seed meter during the mixture phase. During the mixture phase, while applying the lower of the first and second vacuum pressures to the seed meter, evaluation of occurrences of skips continues. If skips are detected, then the vacuum unit is controlled to increase the vacuum pressure. The vacuum unit may increase the vacuum pressure to an intermediate vacuum pressure that has a value between the first and second vacuum pressures. Evaluation of skips may continue during the mixture phase and, if further skips are detected while operating at the intermediate pressure value, then the vacuum unit may further increase to the apply the greater of the first and second vacuum pressures.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
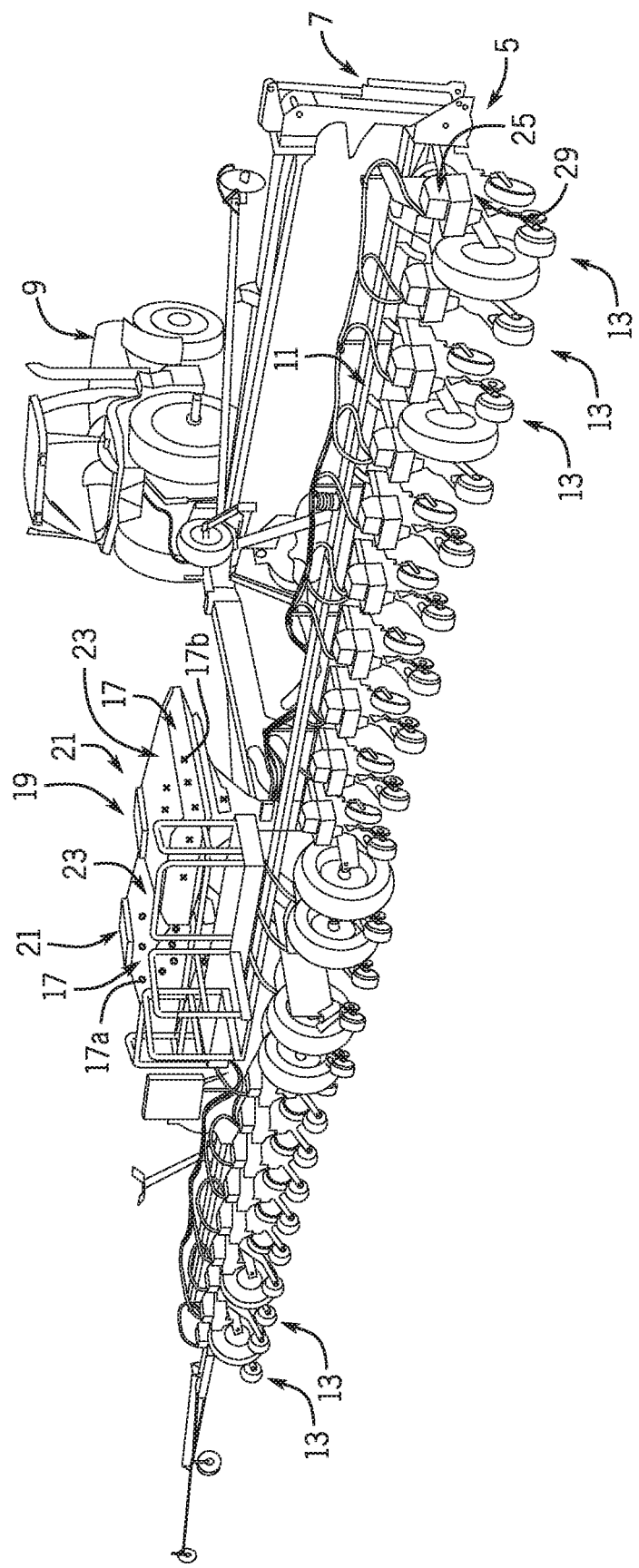
FIG. 1 is an isometric view of a multiple variety planter with a direct vacuum system in accordance with the present invention.

Referring now to the drawings and specifically to FIG. 1, a direct vacuum system is incorporated in a multiple variety planter, shown here as planter 7, that is configured to plant different seed varieties during a single on-the-go planting session. As explained in greater detail elsewhere herein, the direct vacuum system 5 is controlled according to a vacuum application strategy to apply an appropriate vacuum pressure for the particular seed variety being planted at a given time.

Still referring to FIG. 1, planter 7 may be one of the EARLY RISER® series planters available from Case IH and is typically pulled by a traction device such as a tractor 9. A frame 11 of the planter 7 supports multiple row units 13 that are substantially identical. Each row unit 13 includes various support, metering, and ground-engaging components. These may include a sub-frame that is connected to the frame 11 of the planter 7 by way of a parallel linkage system and furrow opening and closing mechanisms toward front and back ends of the row unit 13. The opening and closing mechanisms may include opener disks and closing disks, respectively, or other ground-engaging tools for opening and closing a furrow. Each row unit 13 may include a gauge wheel configured for adjusting furrow depth by limiting soil penetration of the furrow-opening mechanism while creating the furrow, and a press wheel may be arranged to roll over the closed furrow and to further firm the soil over the seed to promote favorable seed-to-soil contact.

Still referring to FIG. 1, seed 17 is held in a seed storage system shown here as bulk storage in a bulk storage system 19. Bulk storage system 19 has at least one bulk fill hopper 21, shown here as having two central bulk fill hoppers 21 supported by the frame 11 of the planter 7, remote from the row units 13. The bulk storage system 19 has two compartments 23 with one shown in each of the bulk fill hoppers 21. It is understood that the bulk or other storage system may have more than two compartments 23, which may correspond to the number of types of seeds being used for multiple-type or variety planting. Additional compartments 23 may be provided in each of the bulk fill hoppers 21 by divider walls or partitions. It is understood that at least some bulk storage may be at the row units 13 themselves, such as by way of manual-fill on-row storage compartments. The different compartments 23 may hold seeds 17 of a different plant type or a common plant type but different types or varieties 17a, 17b, for planting in different multiple-type or variety zones of an agricultural field defined at least in part by characteristics relating to at least one of soil type and management type, or other characteristics such as low/high ground areas, weed issues, insect issues, fungal issues, buffer zones in organic fields that are planted next to non-organic fields, or others, such as those represented as zones Variety-A and Variety-B in a prescription map PM, schematically represented in the path map shown in FIG. 4. Although two different seed types or varieties 17a, 17b are shown, it is understood that other numbers of seed varieties may be stored on and planted by the planter 7 based on, for example, the number of compartments 23 in the bulk storage system 19 for a particular planter 7. Although the seed 17 may be described elsewhere herein as different seed varieties 17a, 17b, it is understood that the description of the different varieties of seed includes different hybrids or types. In other words, the different varieties 17a, 17b of seed 17 include not only different hybrids or varieties of the same plant species, but also different seed products. Different seed products can include seeds of different species, coated and uncoated seeds, such as insecticide coated and non-insecticide coated seeds. The different seed products can also include refuge in a bag seed and non-refuge in a bag seed, plant-parasite resistant seed and non-plant-parasite resistant seed such as cyst nematodes resistant seeds and non-cyst nematodes resistant seeds, herbicide-tolerant seed and non-herbicide tolerant seed, or other different products. The different seed products can further include different crop seeds such as corn and soybeans, oats and barley, different cover crops such as tillage radishes and rye, or various combinations of these or other combinations. Regardless, the different seed varieties 17a, 17b have different physical characteristics such as size, shape, and weight.

Figure 2:
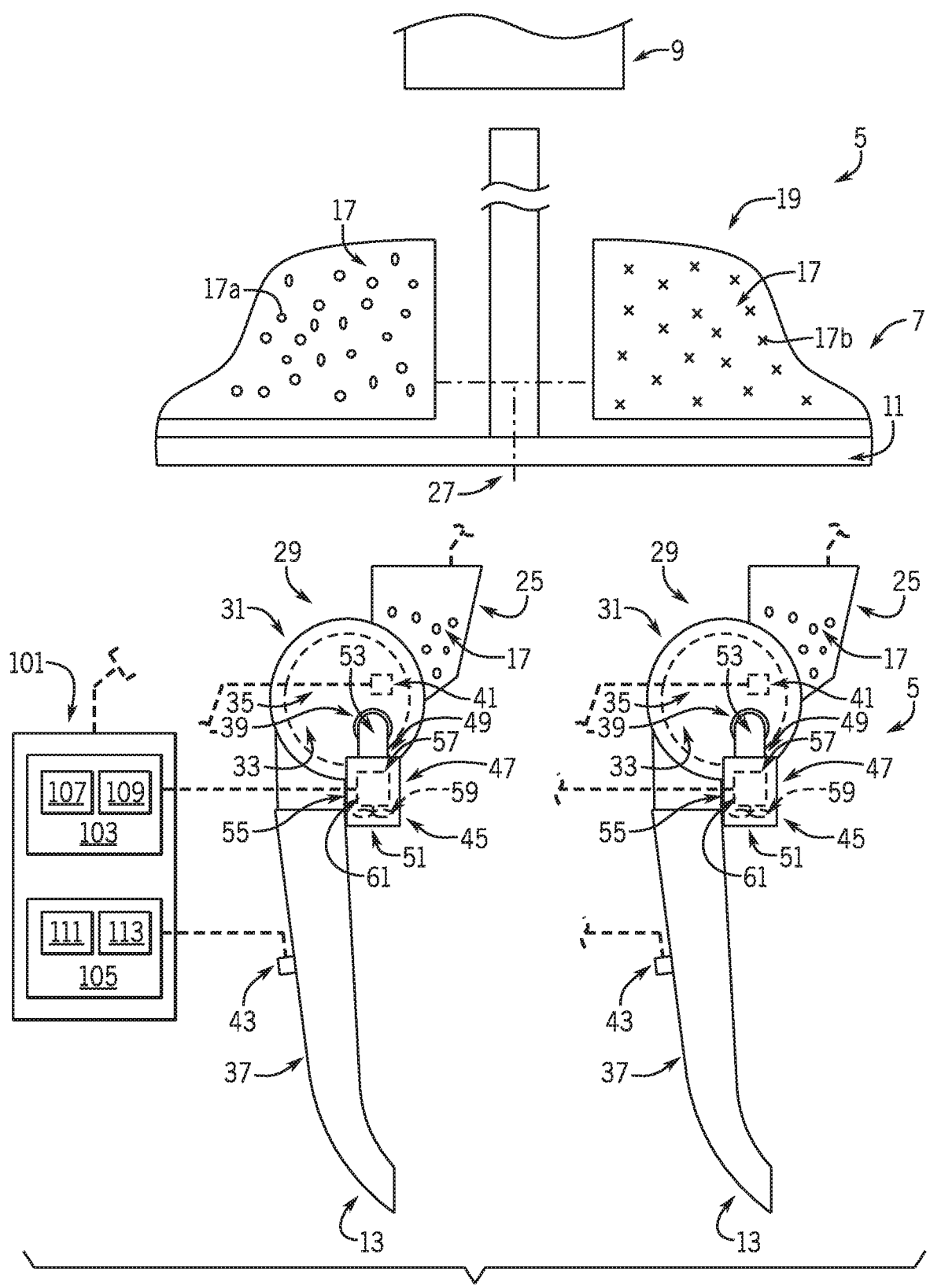
FIG. 2 is a simplified partially schematic view of the direct vacuum system of the planter of FIG. 1.

Referring now to FIG. 2, planter 7 includes a seed conveyance airflow system 27 that includes positive air pressure source(s) such as known pumps, fans, blowers, and/or other known airflow system components to pneumatically deliver seeds of the different types 17a, 17b from the bulk storage system 19 into an on-row storage system 25. Seed conveyance airflow system 27 delivers the seed 17 in an airflow that entrains the seed 17 and flows along a flow path defined by, for example, conduits that extend along the planter 7 to the row units 13 to be dropped into the seed trench formed by the furrow opening mechanism. On-row storage system 25 locally stores relatively small amounts of seeds 17 at each of multiple row units 13 to feed a seed-metering system with a seed meter 29. The seed meters 29 can be configured to simultaneously plant different seed varieties 17a, 17b from the different row units 13, or otherwise switch seed types 17a, 17b being planted from a single row unit 13, as explained in greater detail elsewhere herein. The particular seed variety 17a, 17b that is selectively delivered from bulk storage to the particular row unit(s) 13 is controlled by way of flow-path selecting mechanisms such as gates or valves that are electronically controlled to select a particular hose or other routing passage for the particular compartment(s) 23 and to define the delivery paths through the seed conveyance airflow system 27 to the respective row unit(s) 13.

Referring now to FIG. 2, each seed meter 29 is a vacuum-type seed meter 29 that receives a selected seed variety 17a, 17b from the on-row storage system 25. Seed meter 29 has a seed meter housing 31 with first and second side portions or covers. The side portions or covers connect to each other at their peripheries defined by respective circumferential side walls with the open ends facing toward each other to collectively define an enclosure that surrounds housing cavity 33 in which a seed pool is defined. A metering member 35 may be a disk-shaped, a bowl-shaped, or other type of metering member that can singulate seed 17 and is shown here arranged to rotate at least partially within cavity 33. Although metering member 35 is shown in FIG. 2 as entirely enclosed within housing 31 and its housing cavity 33, it is understood that at least a portion of metering member 35 may extend out of the housing 31 and its housing cavity 33. Other components may be arranged within the housing cavity 33, such as various seals that engage metering member 35 to provide vacuum shutoff and a seed singulator that is configured to inhibit more than one seed from being discharged from the seed meter 29 per seed discharge event. A brush assembly may be arranged within the housing cavity 33 to form a barrier that retains the seed 17 inside the housing cavity 33 instead of, for example, spilling out of the meter through the seed delivery system.

Still referring to FIG. 2, metering member 35 is rotated through at least part of the seed pool to pick up and singulate seeds using seed pockets at a seed pickup region in the housing cavity 33. The individual seeds are moved through the seed meter 29 to a vacuum cutoff area at a release location in the seed meter 29 for individual release through a seed delivery system 37, which may include a seed tube (unlabeled but schematically shown in FIG. 2), a seed delivery belt, or other seed delivery mechanism toward a seed trench of the agricultural field. Rotation of metering member 35 is accomplished by way of a metering member drive system. The metering member drive system may include, for example, various electric or hydraulic motors, drive shafts, chains and belts, clutches, peg-and-hole drive systems, and/or other arrangements such as a directly-driven arrangement in which a motor directly drives the metering member at its hub or periphery.

Still referring to FIG. 2, seed meter housing 31 has a seed meter housing vacuum inlet 39 that connects seed meter 29 to direct vacuum system 5. Direct vacuum system 5 includes a direct vacuum unit shown as vacuum unit 45 at each row unit 13. The vacuum units 45 provide discrete sources of vacuum at each row unit 13 and can be individually and variably controlled to apply variable vacuum pressure to the respective seed meters 29. The vacuum pressure in each seed meter 29 is applied within a vacuum chamber that is on an opposite side of the metering member 35 than the seed pool so that the seeds 17 are held against the metering member 35, such as within the seed pockets, by the vacuum pressure. Different seed varieties 17a, 17b interact in different ways with metering member 35 based on their different physical characteristics, such as size, shape, and weight. These differences require different vacuum pressures in seed meter 29 to sufficiently hold the different seed varieties 17a, 17b against the metering member 35. For example, heavier seeds 17 require greater vacuum pressure to be held in pockets of metering member 35 than lighter seeds 17 and flatter seeds 17 may require more vacuum pressure to be held in pockets of metering member 35 than rounder seeds.

Still referring to FIG. 2 each vacuum unit 45 includes a vacuum unit housing 47, shown here with a tubular configuration. The vacuum unit housing 47 has a vacuum unit inlet 49 at a first end that receives air that is drawn out of the seed meter housing 31 through seed meter housing vacuum inlet 39 and a vacuum unit outlet 51 at a second end that releases air out of the vacuum unit housing 47. Vacuum tube 53 is shown connecting the seed meter housing vacuum inlet 39 and vacuum unit inlet 49; however, it is understood that vacuum unit 45 may be directly connected to seed meter 29. Vacuum unit is shown here with a fan system 55 to create its airflow with fan 57. Fan 57 includes blades 59 and a motor 61 such as an electric motor that rotates the blades 59 to create the airflow that draws air out of and creates the vacuum pressure within seed meter 29. The rotational speed of motor 61 and blades 59 is controlled by control system 101 to vary the vacuum pressure within seed meter 29 individually at each row unit 13 so that the vacuum pressure within each seed meter 29 is separately controlled.

Still referring to FIG. 2, control system 101 includes tractor control system 103 and planter control system 105 that operably communicate with each other, for example, by way of an ISOBUS connection, for coordinating controls of tractor 9 and planter 7, including which seed variety(ies) 17a, 17b is delivered to the seed meters 29, based on the type or variety zones Variety-A, Variety-B, or other zone of the agricultural field is or will be planted. Tractor control system 103 is shown having a tractor controller 107 and power supply 109, and planter control system 105 is shown having a planter controller 111 and power supply 113. Each of the tractor and planter controllers 107, 111 can include an industrial computer or, e.g., a programmable logic controller (PLC), along with corresponding software and suitable memory for storing such software and hardware, including interconnecting conductors for power and signal transmission for controlling respective electronic, electro-mechanical, hydraulic, and pneumatic components of the tractor 9 and planter 7. Tractor controller 107 is configured for controlling the functions of the tractor 9 by controlling, e.g., steering, speed, braking, shifting, and other operations of the tractor, which may include controlling various GPS steering or other GPS-related systems, transmission, engine, hydraulic, and/or other systems of the tractor 9. A tractor interface system is operably connected to the tractor controller 107 and includes a monitor and various input devices to allow an operator to see the statuses and to control various operations of the tractor 9 from within the cab of the tractor 9. The tractor interface system may be a MultiControl Armrest™ console available for use with the Maxxum™ series tractors from Case IH. Planter controller 111 is configured for controlling the functions of planter 7 by controlling, e.g., product conveyance along the planter 7, seed 17 variety delivery selection, and seed delivery out of planter 7 to the field. This may include controlling the pumps, fans, blowers, and/or other airflow system components of the seed conveyance airflow system 27, including actuating the gates, valves, and/or other flow-path selecting mechanisms through various seed-directing hoses or other conduits between the bulk storage system 19 and on-row storage system 25 or between different compartments of the on-row storage systems 25 and the seed meters 29. Planter controller 11 further controls characteristics of seed meters 29 such as adjusting singulator and baffle settings by way of controlling corresponding solenoids, stepper motors, or the like, and further controls the direct vacuum system 5 to implement a vacuum application strategy to apply an appropriate vacuum pressure for the particular seed variety being planted at a given time. This may be done by the control system 101 evaluating which seed variety is being delivered at each row unit 13 and determining a corresponding appropriate vacuum pressure for each row unit's 13 seed meter 29 on a row-by-row basis. The appropriate vacuum pressure values for the different seed varieties may be stored in memory of the control system 101, such as in a lookup table or other appropriate data format. The values may be in terms of actual vacuum pressure within seed meter 29, which may be detected by a pressure sensor(s) 41 in the seed meter 29, or may be correlated to different stored values such as rotational speed(s) of fan 57 that has been previously shown to provide the particular vacuum pressure for the seed variety.

Figure 3:
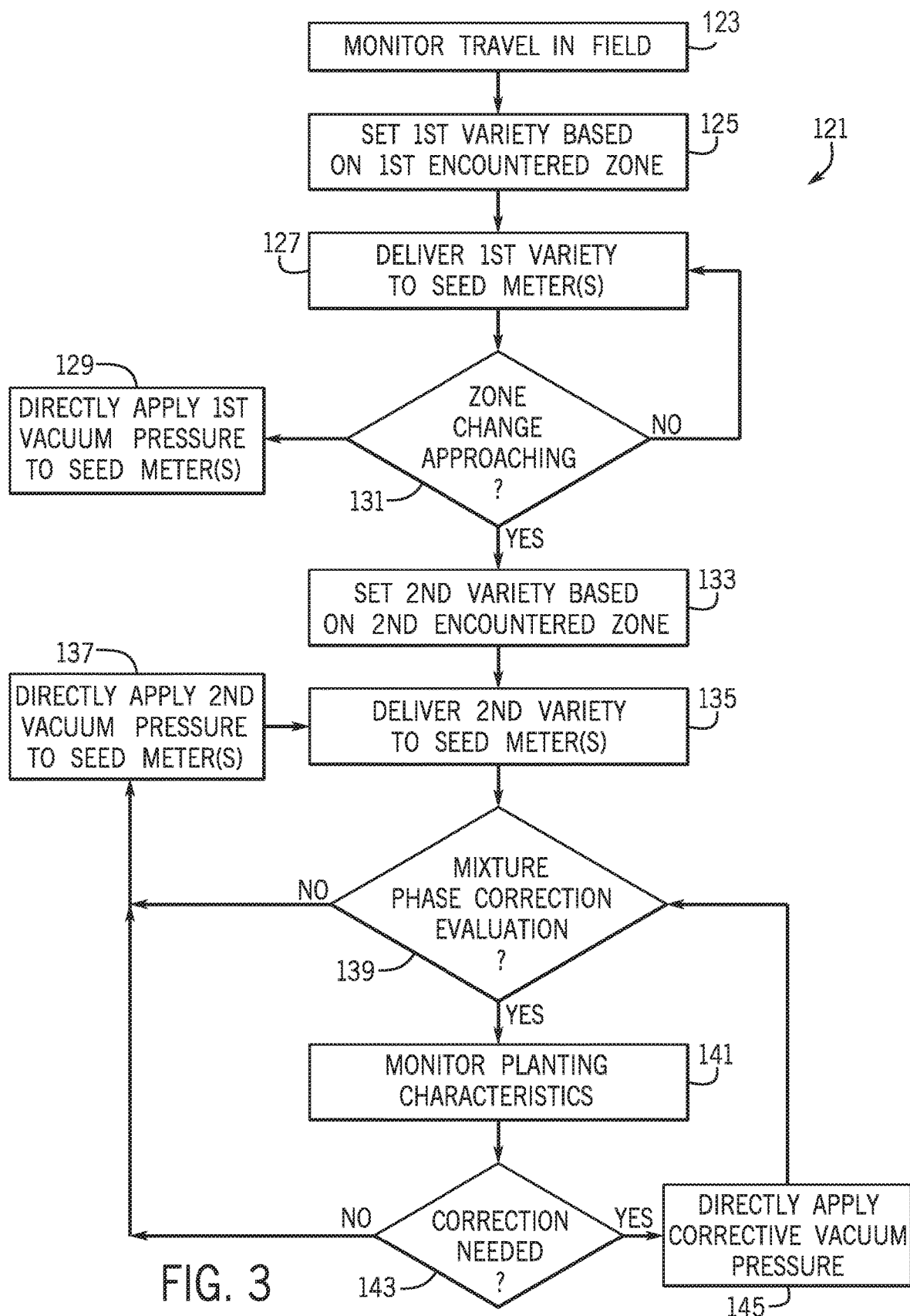
FIG. 3 is a flow diagram of a method of using the direct vacuum system of FIG. 1.

Referring now to FIG. 3, with background reference to FIG. 2 for illustrating components and systems, control system 101 commands application of different vacuum pressures in a seed meter 29 to accommodate different seed-to-seed meter holding characteristics of different seed varieties 17a, 17b based on their different physical characteristics. Although described mostly in general terms of seed variety switching and corresponding direct vacuum control of planter 7, since each row unit 13 has its own sensors and other components that allow for individual control by control system 101, it is understood that the same description applies to individual control at each individual row unit 13 and their corresponding seed meter 29 and direct vacuum unit 45 to provide row-by-row direct vacuum and multi-variety control.

Figure 4:
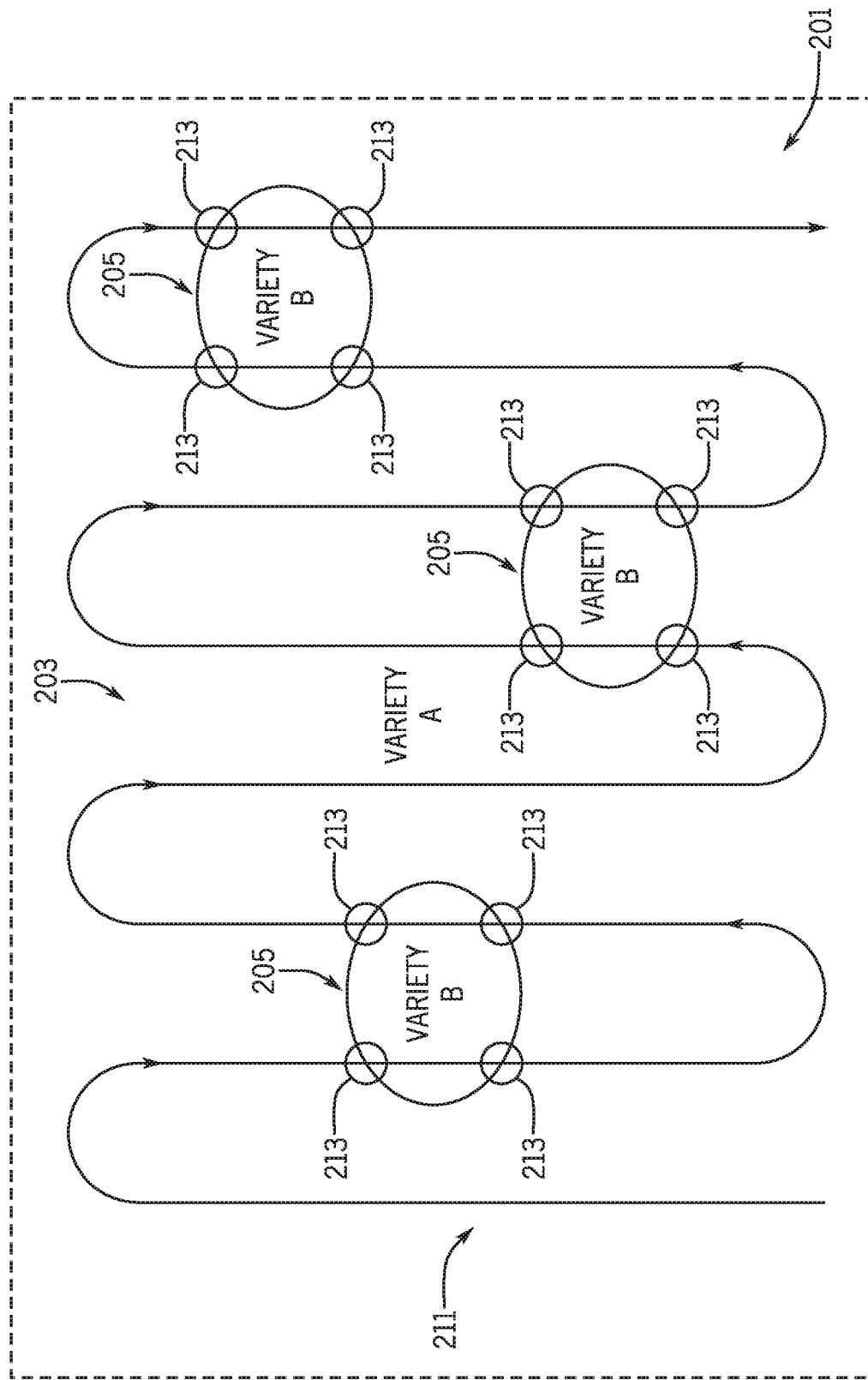
FIG. 4 is a simplified representation of a prescription map shown on a path map of multiple variety planting of a field.

Referring now to FIG. 3, with background reference to FIG. 2 for illustrating components and systems, one exemplary method 121 is represented in the flow diagram, which may be implemented according to the prescription map PM, schematically represented in the path map shown in FIG. 4. Control system 101 monitors where planter 7 and tractor 9 are in the field, as represented at block 123. This may include determining position, heading, and ground speed using the tractor's GPS and/or other systems or sensors. At block 125, control system 101 sets the first seed variety 17a planting to correspond to the first encountered zone. As represented at block 127, control system 101 commands delivery of the first seed variety 17a from the bulk storage system 19 to the seed meter(s) 29. As represented at block 129, control system 101 implements the vacuum strategy by commanding application of the first vacuum pressure directly to seed meter 29 by, for example, controlling the speed of fan 57 of the vacuum unit 45 to achieve the first vacuum pressure that corresponds to that needed for the first seed variety 17a. The first vacuum pressure is typically a previously established appropriate vacuum pressure for the first seed variety that compensates for its characteristics, e.g., size, shape, and weight to avoid multiples and skips.

Continuing to refer to FIG. 3, with background reference to FIG. 2 for illustrating components and systems, control system 101 continues to monitor where planter 7 and/or tractor 9 are in the field, and evaluates whether a zone change is approaching, as shown at block 131. This may be done by determining the presence of an approaching zone change by identifying a zone boundary according to the prescription map PM and evaluating whether the zone boundary is within a predetermined distance and/or estimated time to cross from the current planter 7 and/or tractor 9 position, speed, and heading. If a zone change is not approaching, then planting of the first seed variety 17a continues by further delivering the first seed variety 17a from bulk storage system 19 to the seed meter(s) 29 and direct application of the first vacuum pressure to each seed meter 29 with the respective direct vacuum unit 45 continues according to blocks 127 and 129. At block 131, if control system 101 determines that a zone change is approaching, then control system 101 identifies the next variety zone and sets the next or second seed variety 17b as the current seed variety to correspond to the next or second variety zone that will be encountered, as represented at block 133. Control system 101 commands delivery of the second seed variety 17b to the seed meter(s) 29, as represented at block 135. Delivery of the second seed variety 17b according to block 135 can be delayed in order to plant-out more of the first seed variety 17a before receiving the second seed variety 17b in order to reduce the amount of mixed seed in the seed pool of each seed meter 29, which would potentially be planted as a mixture of the first and second seed varieties 17a, 17b, as a mixture phase of the switchover event. Regardless, as represented at block 137, when the second seed variety 17b is delivered to the seed meter 29, control system 101 commands the direct vacuum unit(s) 45 to apply the second vacuum pressure to seed meter(s) 29. The second vacuum pressure is typically a previously established appropriate vacuum pressure for the second seed variety that compensates for its, e.g., size, shape, and weight to avoid multiples and skips.

Continuing to refer to FIG. 3 with background reference to FIG. 2, as represented at block 139, during the mixture phase of the switchover event, control system 101 may determine whether a vacuum correction evaluation should be performed. This would determine whether planting characteristics such as presence of multiples or skips should be monitored during the mixture phase of the switchover event to see the direct vacuum units 45 should be controlled to vary their vacuum pressure to improve performance during the mixture phase, before fully or further implementing the second vacuum pressure. For example, at block 139, if the first and second seed varieties 17a., 17b have substantially similar vacuum pressure requirements, such as vacuum pressures within 5% or some other threshold of each other, then control system 101 may determine that no mixture phase correction evaluation is required and any mixed seed in the seed pool is planted while the direct vacuum units 45 apply the second vacuum pressure to the seed meters 29. This may occur when the first and second seed varieties 17a, 17b are the same seed type, only one is coated so it weighs slightly more than the other while both have similar sizes and shapes. If, at block 139, the control system 101 determines that the vacuum pressure requirements for the first and second seed varieties 17a, 17b are outside of the threshold for similarity of vacuum pressures for the first and second vacuum pressures, then the mixture phase correction evaluation occurs, as represented at block 141. During this, control system 101 monitors planting characteristics while the mixed seed pool is being planted during the switchover event, such as monitoring for multiples and skips. The valuation may be a comparison of a number of seeds that should have been released from the seed meter 29 in a given period of time or rotation(s) of the metering member 35 as a target number compared to an actual number that was released during the given period of time or rotation(s) of the metering member 35. The actual number may correspond to a counted number determined by a seed detector(s) 43 arranged downstream of the release location and the seed meter 2 for detecting seeds. A counted number that is greater than the target number indicates multiples and a counted number that is less than the target number indicates skips. Whether the number of multiples source skips exceeds a threshold value may indicate whether correction is needed, as represented at block 143.

Continuing to refer to FIG. 3 with background reference to FIG. 2, if at block 143, control system 101 identifies delivery inconsistencies such as multiples or skips, then it commands a vacuum correction by controlling the direct vacuum unit 45, as represented at block 145, to mitigate the delivery inconsistencies during the mixture phase of the switchover event. While the mixture phase of the switchover event remains underway, control system 101 can continue to monitor planting characteristics, determine whether correction is needed and, if so, directly apply a corrective vacuum pressure as respectively represented in blocks 141, 143, and 145.

As one example, control system 101 may command direct vacuum unit 45 to start applying a higher pressure and, if multiples are detected, incrementally decrease pressure until the inconsistencies are sufficiently reduced. Control unit 101 may command direct vacuum unit 45 to apply the greater vacuum pressure of the first and second vacuum pressures to the seed meter 29 to try reducing inconsistencies during the mixture phase. While applying the greater of the first and second vacuum pressures, evaluation of occurrences of multiples continues. If multiples are detected, then the vacuum unit 45 is controlled to decrease the vacuum pressure. The vacuum unit may decrease the vacuum pressure to an intermediate vacuum pressure that has a value between the first and second vacuum pressures. If further occurrences of multiples are identified while operating at the intermediate pressure value, then vacuum unit 45 may further decrease its vacuum pressure to apply the lower of the first and second vacuum pressures.

As another example, control system 101 may command direct vacuum unit 45 to start applying a lower pressure and, if skips are detected, incrementally increase pressure until the inconsistencies are sufficiently reduced. Control unit 101 may command direct vacuum unit 45 to apply the lower vacuum pressure of the first and second vacuum pressures to the seed meter 29 during the mixture phase. While applying the lower of the first and second vacuum pressures to the seed meter 29, evaluation of occurrences of skips continues. If skips are detected, then the vacuum unit 45 is controlled to increase the vacuum pressure. The vacuum unit 45 may increase the vacuum pressure to an intermediate vacuum pressure that has a value between the first and second vacuum pressures. If further occurrences of skips are identified while operating at the intermediate pressure value, then vacuum unit 45 may further increase its vacuum pressure to apply the greater of the first and second vacuum pressures.

Correcting delivery inconsistencies during the mixed phase of the switchover event continues until the mixed seed varieties 17*a*, 17*b* are planted out and only the second seed variety 17*b* is being planted in a steady state, and direct vacuum unit 45 continuously applies the second vacuum pressure to seed meter 29. It is further noted that evaluation of multiples and skips may also be done during steady state planting of the different seed varieties to reduce planting inconsistencies.

Referring now to FIG. 4, a path map is shown with a simplified schematic representation of a prescription map of field 201 showing the two zones of Variety-A and Variety-B, respectively shown as zones 203 and 205 for receiving the two different seed varieties 17*a*, 17*b*. Tractor 9 (FIG. 1) and planter 7 (FIG. 1) travel along path 211 through field 201 while traveling through the Variety-A zone(s) 203 and Variety-B zone(s) 205. Seed variety switching events are shown as circles labeled as switching events 213.

Still referring to FIG. 4, initially, steady state planting of the first seed variety 17*a* occurs and direct vacuum system 5 applies a first vacuum pressure to seed meter 29. Control system 101 commands application of the first vacuum pressure for each of the direct vacuum units 45. When planter 7 (FIG. 1) reaches the first seed-switching event 213 to change planting to the second seed variety 17*b*, control system 101 commands a stop of the delivery of the first seed variety 17*a* to the seed meters 29 and the start of the delivery of the second seed variety 17*b* to the seed meters 29 by manipulating appropriate delivery gates within the seed supply mechanism on the row unit. At the same time, control system 101 controls the direct vacuum units 45 to apply the second vacuum pressure to the seed meters 29. If fewer than all of the row units 13 cross into Variety-B zone 205 at the first seed-switching event 213, then control system 101 only changes seed variety and the vacuum pressure applied by the vacuum units 45 in the row units 13 that enter Variety-B zone 205 to the second vacuum pressure while maintaining delivery of the first seed variety 17*a* and the first vacuum pressure for the vacuum units 45 at the row units 13 that remain in Variety-A zone 203 at that time. The next shown seed-switching event 213 corresponds to exiting the Variety-B zone 205 and reentering the Variety-A zone 203. Control system 101 commands switching from seed variety 17*b* back to seed variety 17*a* by manipulating appropriate delivery gates within the seed supply mechanism on the row unit, while simultaneously commanding the vacuum units 45 to change back to an application of first vacuum pressure within seed meter(s) 29. The process repeats in this way during planting and is modified based on, for example, the number of variety zones in the field and the number of seed varieties being planted.

Many changes and modifications could be made to the invention without departing from the spirit thereof. Various components and features of the direct vacuum system 5, seed metering system(s), and other systems and components can be incorporated alone or in different combinations on a planter. The scope of these changes will become apparent from the appended claims.

We claim:

1. A method of planting multiple seed varieties during a single planting session with a multiple variety seed planter with a direct vacuum system, the method comprising:
    delivering seed of a first seed variety from a seed meter having a metering member of a row unit of a multiple variety planter;
    operating a fan associated with the row unit to apply a first vacuum pressure to the metering member of the seed meter independently of at least one other row unit to hold the seeds of the first seed variety against the metering member with the first vacuum pressure that corresponds to a characteristic of the first seed variety;
    switching delivery of seed to the seed meter from the first seed variety to a second seed variety; and
    operating a fan associated with the row unit to apply a second vacuum pressure to the metering member of the seed meter to hold the seeds of the second seed variety against the metering member with the second vacuum pressure that corresponds to a characteristic of the second seed variety.

2. The method of claim 1, further comprising:
    determining a mixture phase corresponding to a switchover event for changing between which of the first and second seed types is delivered from the seed meter and during which seeds of both of the first and second seed varieties are in a seed pool of the seed meter; and
    controlling a vacuum unit at the row unit based on the mixture phase.

3. The method of claim 2, further comprising:
    wherein the vacuum unit is controlled to apply a greater one of the first and second vacuum pressures to the seed meter during the mixture phase.

4. The method of claim 3, wherein during the mixture phase, while applying the greater one of the first and second vacuum pressures to the seed meter, the method further comprises:
    evaluating occurrences of multiples corresponding to multiple seeds being released from the seed meter during a release event and when multiples are detected, and
    controlling the vacuum unit to decrease the vacuum pressure.

5. The method of claim 4, further comprising:
    controlling the vacuum unit to decrease the vacuum pressure to an intermediate vacuum pressure that has a value between the first and second vacuum pressures.

6. The method of claim 5, further comprising:
    continuing to evaluate occurrences of multiples while the vacuum unit applies the intermediate vacuum pressure and when multiples are detected, controlling the vacuum unit to decrease the vacuum pressure to apply the lower one of the first and second vacuum pressures to the seed meter during the mixture phase.

7. The method of claim 3, further comprising:
wherein the vacuum unit is controlled to apply a lower one of the first and second vacuum pressures to the seed meter during the mixture phase.

8. The method of claim 7, wherein during the mixture phase, while applying the lower one of the first and second vacuum pressures to the seed meter, further comprises:
evaluating occurrences of skips corresponding to no seeds being released from the seed meter during a release event, and when skips are detected, controlling the vacuum unit to increase the vacuum pressure.

9. The method of claim 8, further comprising:
controlling the vacuum unit to increase the vacuum pressure to an intermediate vacuum pressure that has a value between the first and second vacuum pressures.

10. The method of claim 9, further comprising:
continuing to evaluate occurrences of skips while the vacuum unit applies the intermediate vacuum pressure and when skips are detected, controlling the vacuum unit to increase the vacuum pressure to apply the greater one of the first and second vacuum pressures to the seed meter during the mixture phase.

11. A method of planting multiple seed varieties during a single planting session with a multiple variety seed planter with a direct vacuum system, the method comprising:
delivering seed of a first seed variety from a seed meter having a metering member of a row unit of a multiple variety planter;
rotating a fan supported by the row unit at a first rotational speed to generate a first vacuum pressure to the metering member of the seed meter independently of at least one other row unit to hold the seeds of the first seed variety against the metering member with the first vacuum pressure that corresponds to a characteristic of the first seed variety;
switching delivery of seed to the seed meter from the first seed variety to a second seed variety; and
rotating the fan supported by the row unit at a second rotational speed to generate a second vacuum pressure to the metering member of the seed meter to hold the seeds of the second seed variety against the metering member with the second vacuum pressure that corresponds to a characteristic of the second seed variety.

12. The method of claim 11, further comprising:
determining a mixture phase corresponding to a switchover event for changing between which of the first and second seed types is delivered from the seed meter and during which seeds of both of the first and second seed varieties are in a seed pool of the seed meter; and
controlling a vacuum unit at the row unit based on the mixture phase.

13. The method of claim 12, further comprising:
wherein the vacuum unit is controlled to apply a greater one of the first and second vacuum pressures to the seed meter during the mixture phase.

14. The method of claim 13, wherein during the mixture phase, while applying the greater one of the first and second vacuum pressures to the seed meter, the method further comprises:
evaluating occurrences of multiples corresponding to multiple seeds being released from the seed meter during a release event and when multiples are detected, and
controlling the vacuum unit to decrease the vacuum pressure.

15. The method of claim 14, further comprising:
controlling the vacuum unit to decrease the vacuum pressure to an intermediate vacuum pressure that has a value between the first and second vacuum pressures.

16. A method of planting multiple seed varieties during a single planting session with a multiple variety seed planter with a direct vacuum system, the method comprising:
delivering seed of a first seed variety from a seed meter having a metering member of a row unit of a multiple variety planter;
operating a vacuum unit supported by the row unit at a first vacuum pressure to the metering member of the seed meter independently of at least one other row unit to hold the seeds of the first seed variety against the metering member with the first vacuum pressure that corresponds to a characteristic of the first seed variety; and
operating a vacuum unit supported by the row unit at a second vacuum pressure to the metering member of the seed meter to hold the seeds of the second seed variety against the metering member with the second vacuum pressure that corresponds to a characteristic of the second seed variety.

17. The method of claim 16, further comprising:
wherein the vacuum unit is controlled to apply a greater one of the first and second vacuum pressures to the seed meter during the mixture phase.

18. The method of claim 17, further comprising:
wherein the vacuum unit is controlled to apply a lower one of the first and second vacuum pressures to the seed meter during the mixture phase.

19. The method of claim 18, wherein during the mixture phase, while applying the lower one of the first and second vacuum pressures to the seed meter, the method further comprises:
evaluating occurrences of skips corresponding to no seeds being released from the seed meter during a release event, and when skips are detected, controlling the vacuum unit to increase the vacuum pressure.

20. The method of claim 19, further comprising:
controlling the vacuum unit to increase the vacuum pressure to an intermediate vacuum pressure that has a value between the first and second vacuum pressures.

* * * * *